United States Patent
Kim (10) Patent No.: US 10,635,151 B2
(45) Date of Patent: *Apr. 28, 2020

(54) METHOD AND SYSTEM OF UNIVERSAL SERIAL BUS POWER-DELIVERY WHICH STOPS CLOCK SIGNAL GENERATION UNTIL ATTACH EVENT OCCURS

(71) Applicant: SAMSUNG ELECTRONICS CO., LTD., Suwon-si, Gyeonggi-do (KR)

(72) Inventor: Je Kook Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,408

(22) Filed: Mar. 19, 2019

(65) Prior Publication Data

US 2019/0220075 A1   Jul. 18, 2019

Related U.S. Application Data

(63) Continuation of application No. 15/277,515, filed on Sep. 27, 2016, now Pat. No. 10,261,557.

(30) Foreign Application Priority Data

Jan. 29, 2016   (KR) .......................... 10-2016-0011277

(51) Int. Cl.
*G06F 13/20*   (2006.01)
*G06F 1/26*   (2006.01)
(Continued)

(52) U.S. Cl.
CPC ............... *G06F 1/266* (2013.01); *G06F 1/10* (2013.01); *G06F 1/324* (2013.01); *G06F 1/3253* (2013.01);
(Continued)

(58) Field of Classification Search
CPC .... G06F 1/266; G06F 13/4282; G06F 13/385; G06F 1/3296; G06F 1/10; G06F 1/3253;
(Continued)

(56) References Cited

U.S. PATENT DOCUMENTS

| 7,443,627 | B1 * | 10/2008 | Krishnamoorthy .. | G11B 25/043 |
| | | | | 360/69 |
| 9,400,456 | B2 | 7/2016 | Agarwal et al. | |

(Continued)

FOREIGN PATENT DOCUMENTS

| JP | 20130142908 | 1/2012 |
| KR | 20040063297 A | 7/2004 |

OTHER PUBLICATIONS

"Universal Serial Bus Type-C Cable and Connector Specification," Revision 1.1, Apr. 3, 2015.

*Primary Examiner* — Jing-Yih Shyu
(74) *Attorney, Agent, or Firm* — Volentine, Whitt & Francos, PLLC (57) ABSTRACT

A USB power-delivery device includes a clock signal generator which stops generation of a clock signal for a dual-role port (DRP) while the USB power-delivery device operates in a low power mode until an attach event occurs, and starts the generation of the clock signal for the DRP after the attach event occurs.

20 Claims, 8 Drawing Sheets

(51) Int. Cl.
*G06F 1/324* (2019.01)
*G06F 1/3234* (2019.01)
*G06F 13/38* (2006.01)
*G06F 13/42* (2006.01)
*G06F 1/10* (2006.01)
*G06F 1/3296* (2019.01)

(52) U.S. Cl.
CPC .......... *G06F 1/3296* (2013.01); *G06F 13/385* (2013.01); *G06F 13/4282* (2013.01); *G06F 2213/0042* (2013.01); *Y02D 10/14* (2018.01); *Y02D 10/151* (2018.01)

(58) Field of Classification Search
CPC ............. G06F 1/324; G06F 2213/0042; G06F 13/4022; Y02D 10/14; Y02D 10/151
See application file for complete search history.

(56) References Cited

U.S. PATENT DOCUMENTS

| | | | |
|---|---|---|---|
| 9,400,546 B1* | 7/2016 | Agarwal | G06F 1/266 |
| 2013/0117489 A1* | 5/2013 | Doshi | G06F 13/20 |
| | | | 710/313 |
| 2013/0268789 A1* | 10/2013 | Yang | G06F 1/3278 |
| | | | 713/323 |
| 2015/0067374 A1 | 3/2015 | Kim | |
| 2015/0143138 A1 | 5/2015 | Chang | |
| 2015/0268688 A1 | 9/2015 | Leinonen et al. | |
| 2015/0269102 A1 | 9/2015 | Inha et al. | |
| 2015/0270733 A1 | 9/2015 | Inha et al. | |
| 2015/0293514 A1 | 10/2015 | Tupala | |
| 2015/0331826 A1 | 11/2015 | Ghosh et al. | |
| 2015/0346790 A1 | 12/2015 | Talmola | |
| 2015/0362984 A1* | 12/2015 | Waters | G06F 1/3287 |
| | | | 713/324 |
| 2015/0370299 A1* | 12/2015 | Waters | G06F 1/26 |
| | | | 713/310 |
| 2015/0378418 A1* | 12/2015 | Gerber | G06F 1/324 |
| | | | 713/322 |
| 2016/0170472 A1* | 6/2016 | Cosaro | G06F 1/3287 |
| | | | 710/104 |
| 2016/0170929 A1* | 6/2016 | Pethe | G06F 13/102 |
| | | | 710/313 |
| 2016/0188514 A1* | 6/2016 | Forghani-Zadeh | G06F 13/385 |
| | | | 710/313 |
| 2016/0190794 A1* | 6/2016 | Forghani-Zadeh | H02H 7/20 |
| | | | 361/86 |
| 2016/0191313 A1* | 6/2016 | Chen | H04L 41/0816 |
| | | | 370/315 |
| 2016/0283423 A1* | 9/2016 | Srivastava | G06F 13/362 |
| 2016/0285757 A1* | 9/2016 | Srivastava | H04L 12/10 |
| 2017/0160735 A1* | 6/2017 | Mikan | B64C 39/024 |
| 2017/0192446 A1* | 7/2017 | Su | G05F 3/02 |
| 2018/0323563 A1* | 11/2018 | Xu | H01R 13/665 |

* cited by examiner

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

METHOD AND SYSTEM OF UNIVERSAL SERIAL BUS POWER-DELIVERY WHICH STOPS CLOCK SIGNAL GENERATION UNTIL ATTACH EVENT OCCURS

CROSS-REFERENCE TO RELATED APPLICATION

This is a Continuation of U.S. application Ser. No. 15/277,515, filed Sep. 27, 2016 and issued on 16 Apr. 2019 as U.S. Pat. No. 10,261,557, which claims priority under 35 U.S.C. § 119 from Korean Patent Application No. 10-2016-0011277 filed on Jan. 29, 2016 the disclosure of which is hereby incorporated by reference in its entirety

BACKGROUND

Embodiments of the present inventive concept relate to a universal serial bus (USB) power-delivery device, and more particularly to a USB power-delivery device which stops generation of a clock signal for a dual-role port (DRP) in a low power mode until an attach event occurs, and starts the generation of the clock signal for the DRP after the attach event occurs, and a system including the same.

A universal serial bus (USB) power-delivery device complying with a USB power delivery standard may be used as a dual role port (DRP), a downstream facing port (DFP), or an upstream facing port (UFP).

The USB power-delivery device used as the DRP periodically transits between a DFP state and a UFP state until an attach event occurs. For example, a first USB power-delivery device used as the DRP determines whether a second USB power-delivery device is connected to a USB type-C receptacle interface through a USB type-C cable assembly while alternately connecting a pull-up resistor and a pull-down resistor with the configuration channel pins CC1 and CC2 included in the USB type-C receptacle interface, and thereby the power consumed in the USB power-delivery device used as the DRP increases.

SUMMARY

An exemplary embodiment of the present inventive concepts is directed to a universal serial bus (USB) power-delivery device, including a clock signal generator which, while the USB power-delivery device operates in a low power mode, stops generation of a clock signal for a dual-role port (DRP) until an attach event occurs, and starts the generation of the clock signal for the DRP after the attach event occurs.

Another exemplary embodiment of the present inventive concepts is directed to a mobile device, including an application processor, a USB type-C interface for communicating with the application processor, and a control circuit connected to the USB type-C interface, in which the control circuit includes a clock signal generator which, in a low power mode, stops generation of a clock signal for a dual-role port (DRP) until an attach event occurs, and starts the generation of the clock signal for the DRP after the attach event occurs.

Still another exemplary embodiment of the present inventive concepts is directed to a device including: a USB type-C interface for connecting the device with a second device via a USB cable assembly including a cable attached to at least one plug, wherein the USB type-C interface includes one or more switches for operating the USB type-C interface as a dual-role port (DRP); and a control circuit configured to control the one or more switches of the USB type-C interface, wherein the control circuit is configured to generate a switch signal for switching at least one of the switches of the USB type-C interface after the second device is attached to the USB type-C interface while the USB type-C interface is in a low power mode, and to inhibit generation of the switch signal and switching of the at least one of the switches while the USB type-C interface is in the low power mode before the second device is attached to the USB type-C interface.

DETAILED DESCRIPTION OF THE EMBODIMENTS

The present specification includes information contained in Universal Serial Bus (USB) Type-C Cable and Connector Specification Revision 1.1 disclosed on Apr. 3, 2015 (hereinafter "USB Specification Rev. 1.1") as reference and which is incorporated herein. Accordingly, unless differently described herein, terms and description thereof included in the Revision 1.1 are the same as terms and description thereof written herein. A USB power-delivery device herein is a concept including both a USB power delivery source device and a USB power delivery sink device.

Figure 1A:
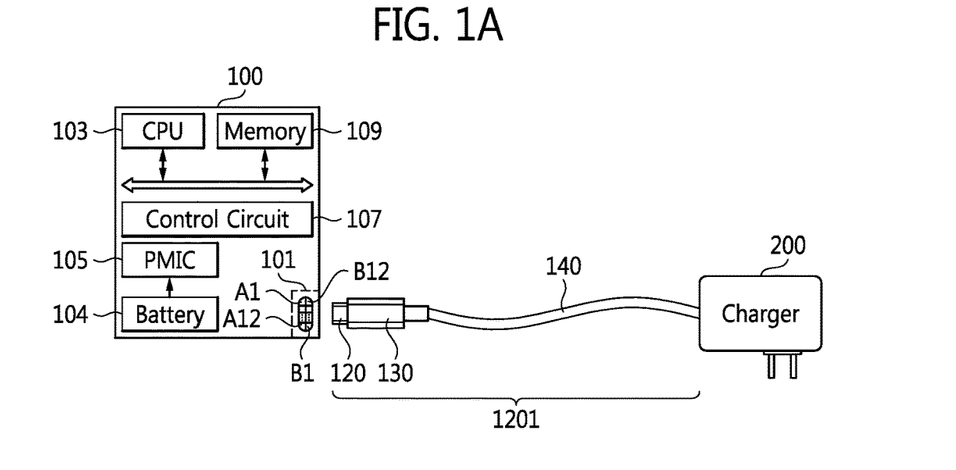
FIGS. 1A, 1B and 1C schematically show systems including USB power-delivery devices.
Figure 1B:
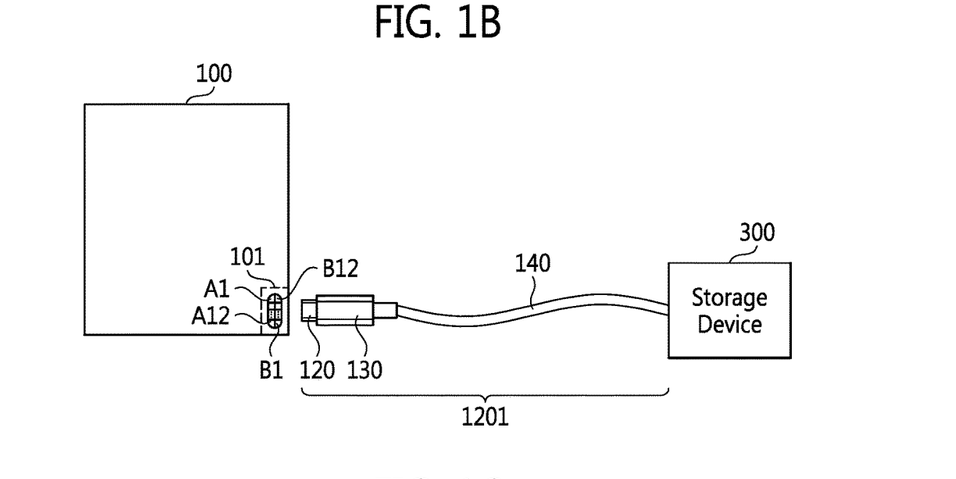
Figure 1C:
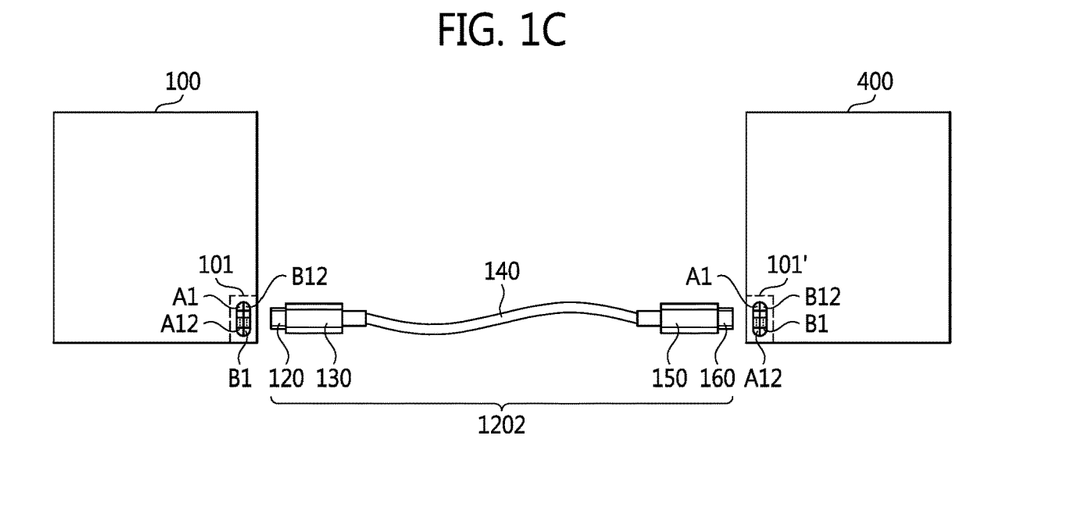

FIGS. 1A to 1C schematically show systems including USB power-delivery devices. Referring to FIG. 1A, a first USB power-delivery device 100 may be connected to a second USB power-delivery device 200 through a USB type-C cable assembly 1201.

The first USB power-delivery device 100 is a USB device including a USB type-C receptacle interface (or USB type-C interface 101) and may be used as a downstream facing port (DFP), a dual role port (DRP), or an upstream facing port (UFP). For example, first USB power-delivery device 100 may be embodied as a personal computer (PC) or a mobile device.

The mobile device may be embodied, for example in a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, an internet of everything (IoE) device, a drone, or an e-book.

USB type-C cable assembly 1201 may be embodied as a USB full-featured type-C standard cable assembly, a USB 2.0 type-C cable assembly, a USB type-C to USB 3.1 standard-A cable assembly, a USB type-C to USB 2.0 standard-A cable assembly, a USB type-C to USB 3.1 standard-B cable assembly, a USB type-C to USB 2.0 standard-B cable assembly, a USB type-C to USB 2.0 Mini-B cable assembly, a USB type-C to USB 3.1 Micro-B cable assembly, or a USB type-C to USB 2.0 Micro-B cable assembly. However, it is not limited thereto.

First USB power-delivery device 100 may include a USB type-C receptacle interface 101, a central processing unit (CPU) 103, a battery 104, a power management IC (PMIC) 106, a control circuit 107, and a memory device 109. According to exemplary embodiments, first USB power-delivery device 100 may not include battery 104. According to exemplary embodiments, USB type-C receptacle interface 101, CPU 103, control circuit 107, and memory device 109 may be integrated to a system on chip (SoC), and the SoC may be used as an application processor (AP).

CPU 103 may control power management IC 106, control circuit 107, and memory device 109. According to exemplary embodiments, control circuit 107 may be integrated along with USB type-C receptacle interface 101.

Battery 104 may serve as a rechargeable battery and supply a battery voltage to power management IC 106. For example, the battery may be embodied as a flexible battery.

Power management IC 106 may supply a corresponding operation voltage (or power) to each of USB type-C receptacle interface 101, CPU 103, control circuit 107, and memory device 109. Power management IC 105 may include voltage regulators, e.g., low drop out (LDO) voltage regulators.

When an operation mode of first USB power-delivery device 100 is a low power mode or power save mode, control circuit 107 may sense or detect a change in at least one voltage (for example, VBUS voltage, a configuration channel 1 (CC1) voltage, and/or a configuration channel 2 (CC2) voltage) input though USB type-C receptacle interface 101 and control a clock signal generator which stops generation of a clock signal for a dual-role port (DRP) until an attach event occurs, and start the generation of the clock signal for the DRP after the attach event occurs. As a result, power consumption of the first USB power-delivery device 100 may be reduced.

Memory device 109 may include a volatile memory device and/or a non-volatile memory device. The volatile memory device may include a random access memory (RAM), a dynamic RAM (DRAM), and/or a static RAM (SRAM), and the non-volatile memory device may include a read only memory (ROM) and/or a flash memory.

USB type-C cable assembly 1201 may include a cable 140 including a first plug 120, a first over-mold 130, and wires. For example, second USB power-delivery device 200 may be a charger. For example, when second USB power-delivery device 200 is used as a source, first USB power-delivery device 100 may be used as a sink.

Referring to FIG. 1B, first USB power-delivery device 100 may be connected to a third USB power-delivery device 300 through USB type-C cable assembly 1201. According to exemplary embodiments, third USB power-delivery device 300 used as a storage device may be embodied as a solid state drive or solid state disk (SSD), a universal flash storage (UFS), or a hard disk drive (HDD). However, it is not limited thereto. For example, when first USB power-delivery device 100 is used as a source, third USB power-delivery device 300 may be used as a sink.

Referring to FIG. 1C, first USB power-delivery device 100 may be connected to a fourth USB power-delivery device 400 through a USB type-C cable assembly 1202.

USB type-C cable assembly 1202 may include a first plug 120, a first overmold 130, a cable 140, a second overmold 150, and a second plug 160. Each of overmolds 130 and 150 may include an IC required for an operation of each of USB type-C cable assemblies 1201 and 1202.

Fourth USB power-delivery device 400 may be used as a DFP, a DRP, or a UFP as a USB device including a USB type-C receptacle interface 101'. For example, fourth USB power-delivery device 400 may be embodied as a PC or a mobile device described above. For example, fourth power-delivery device 400 may be the same as or similar to first USB power-delivery device 100 in structure.

According to exemplary embodiments, when first USB power-delivery device 100 is used as the DFP, fourth USB power-delivery device 400 may be used as the UFP. When first USB power-delivery device 100 is used as the DFP, fourth USB power-delivery device 400 may be used as the DRP. When first USB power-delivery device 100 is used as the DRP, fourth USB power-delivery device 400 may be used as the UFP.

According to exemplary embodiments, when first USB power-delivery device 100 is a first DRP used as the DFP, fourth USB power-delivery device 400 may be a second DRP used as the UFP. When first USB power-delivery device 100 is the first DRP used as the UFP, fourth USB power-delivery device 400 may be the second DRP used as the DFP. For example, when first USB power-delivery device 100 is used as one of a source and a sink, fourth USB power-delivery device 400 may be used as the other of the source and the sink.

Figure 2:
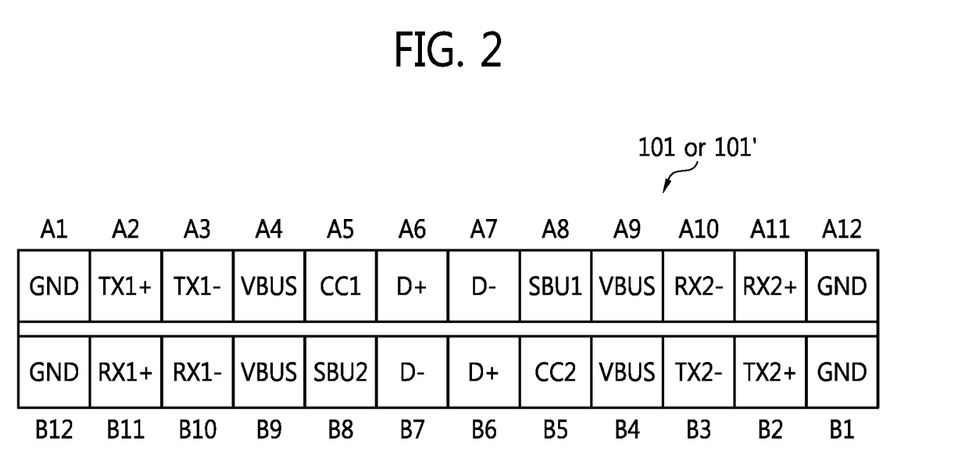
FIG. 2 shows a USB type-C receptacle interface shown in FIGS. 1A to 1C.

FIG. 2 shows a USB type-C receptacle interface shown in FIGS. 1A to 1C. Referring to FIGS. 1A-1C and 2, USB type-C receptacle interface 101 or 101' may include a plurality of pins A1 to A12 and B1 to B12. A signal name and description of each of the plurality of pins A1 to A12 and B1 to B12 are described in USB Specification Rev. 1.1, and thus description thereof will be omitted.

Figure 3:
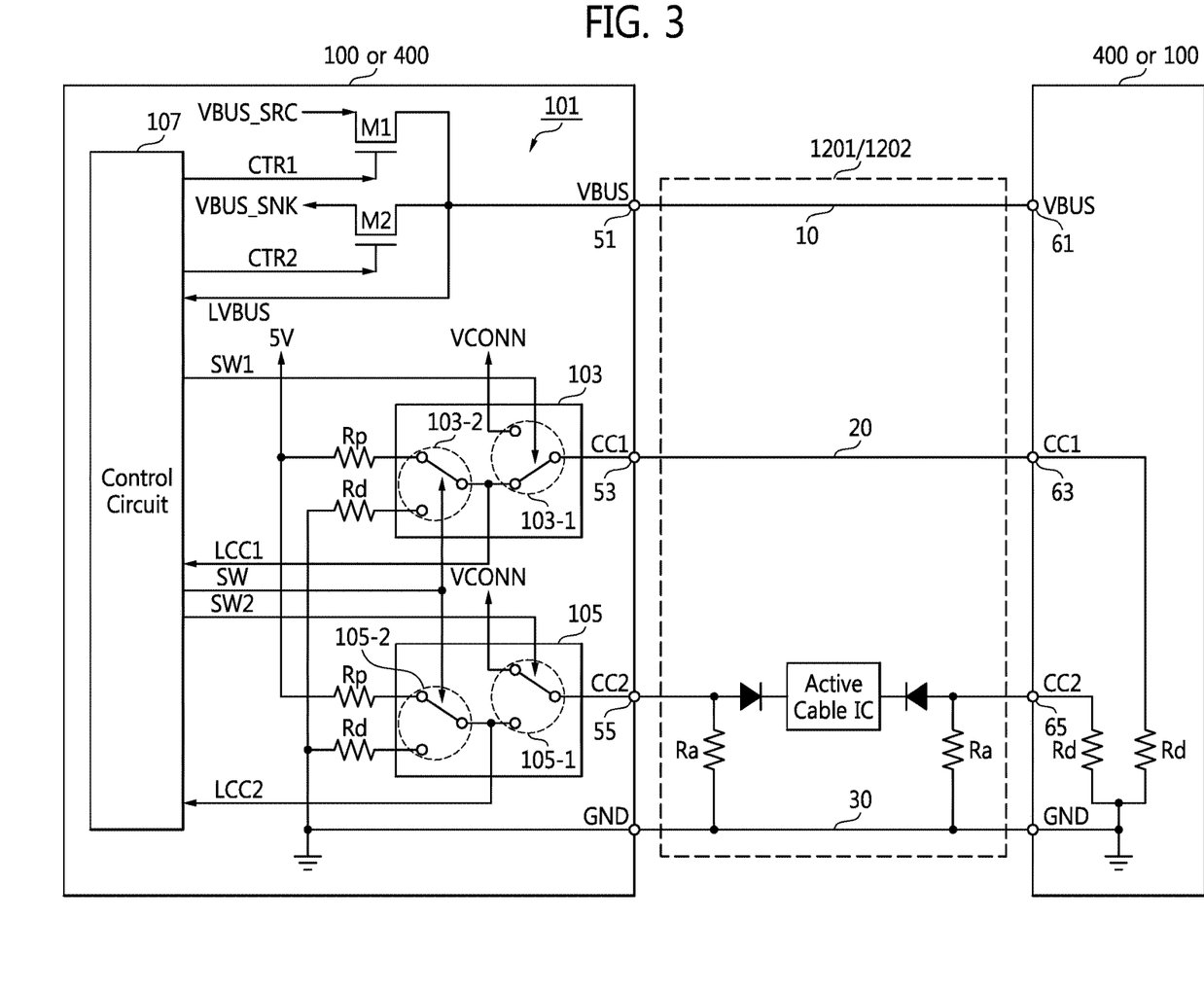
FIG. 3 is a block diagram of a USB power-delivery device which stops generation of a clock signal for a dual-role port (DRP) until an attach event occurs in a low power mode and starts the generation of the clock signal for the DRP after the attach event occurs according to an exemplary embodiment of the present inventive concepts.

FIG. 3 is a block diagram of a USB power-delivery device which, in a low-power mode, stops generation of a clock signal for a dual-role port (DRP) until an attach event occurs, and starts the generation of the clock signal for the DRP after the attach event occurs according to an exemplary embodiment of the present inventive concepts.

It is assumed that USB power-delivery device 100 or 400 used as a source and USB power-delivery device 400 or 100 used as a sink are connected to each other through USB type-C cable assembly 1201 or 1202. USB type-C cable assembly 1201 and 1202 includes an active cable IC and Ra. Ra refers to a resistance that exists between a pin (for example, CC2 pin 65) for outputting VCONN and ground GND. Here, CC refers to a configuration channel. VCONN is a voltage supplied to a CC pin (for example, CC2 pin 55) which is not used to supply power to USB type-C cable assembly 1201 or 1202, GND is a return current path, and 30 is a ground line FIG. 3 illustrates a plurality of pins VBUS, CC1, CC2 and GND, However, other pins not illustrated may be connected to corresponding pins included in first plug 120. VBUS pins are pins for a USB cable bus power defined in USB Specification Rev. 1.1, and pins CC1 and CC2 are used to detect connections and are used to configure an interface between a USB type-C cable and connectors.

USB type-C receptacle interface 101 or 101' includes a plurality of MOSFETs M1 and M2, a first switch circuit 103, and a second switch circuit 105. USB type-C receptacle interface 101 or 101' may refer to a USB type-C interface or connectors.

A first MOSFET M1 may supply a source voltage VBUS_SRC to VBUS pin 51 in response to a first control signal CTR1 output from control circuit 107. A second MOSFET M2 may supply a sink voltage VBUS_SNK supplied through VBUS pin 51 to the inside in response to a second control signal CTR2 output from control circuit 107. A voltage LVBUS of VBUS pin 51 may be supplied to control circuit 107. For example, a portion or all of control circuit 107 may be included in connection and marked cable detection, cold-socket, & VCONN control described in USB Specification Rev. 1.1.

First switch circuit 103 may include a first switch 103-1 and a second switch 103-2. First switch 103-1 may supply VCONN to a CC1 pin 53 or connect CC1 pin 53 to second switch 103-2 in response to a first switch signal SW1 output from control circuit 107. Second switch 103-2 may connect one of a pull-up resistor Rp and a pull-down resistor Rd with first switch 103-1 in response to a third switch signal SW output from control circuit 107. The third switch signal SW may be used as a switch signal for the DRP. A voltage LCC1 of first switch circuit 103 is supplied to control circuit 107.

Second switch circuit 105 may include a third switch 105-1 and a fourth switch 105-2. Third switch 105-1 may supply VCONN to a CC2 pin 55 or connect the CC2 pin 55 to fourth switch 105-2 in response to a second switch signal SW2 output from control circuit 107. Fourth switch 105-2 may connect one of the pull-up resistor Rp and the pull-down resistor Rd with third switch 105-1 in response to the third switch signal SW output from control circuit 107. A voltage LCC2 of second switch circuit 105 is supplied to control circuit 107.

When first USB power-delivery device 100 is used as a source and fourth USB power-delivery device 400 is used as a sink, a source voltage VBUS_SRC is supplied to a VBUS pin 61 of fourth USB power-delivery device 400 through the first MOSFET M1, VBUS pin 51, and a first wire 10.

In this case, the pull-up resistor Rp and CC1 pin 53 of first USB power-delivery device 100 are connected to each other through first switch circuit 103, CC1 pin 53 is connected to a CC1 pin 63 of fourth USB power-delivery device 400 through a second wire 20, and CC1 pin 63 of fourth USB power-delivery device 400 is connected to ground through the pull-down resistor Rd. Accordingly, the voltage LCC1 of first switch circuit 103 is pulled-down from 5V.

Also in this case, VCONN is supplied to CC2 pin 55 connected to a resistor Ra included in a cable through third switch 105-1. Fourth switch 105-2 is connected to the pull-up resistor Rp, and thus the voltage LCC2 of second switch circuit 105 maintains 5V.

Figure 4:
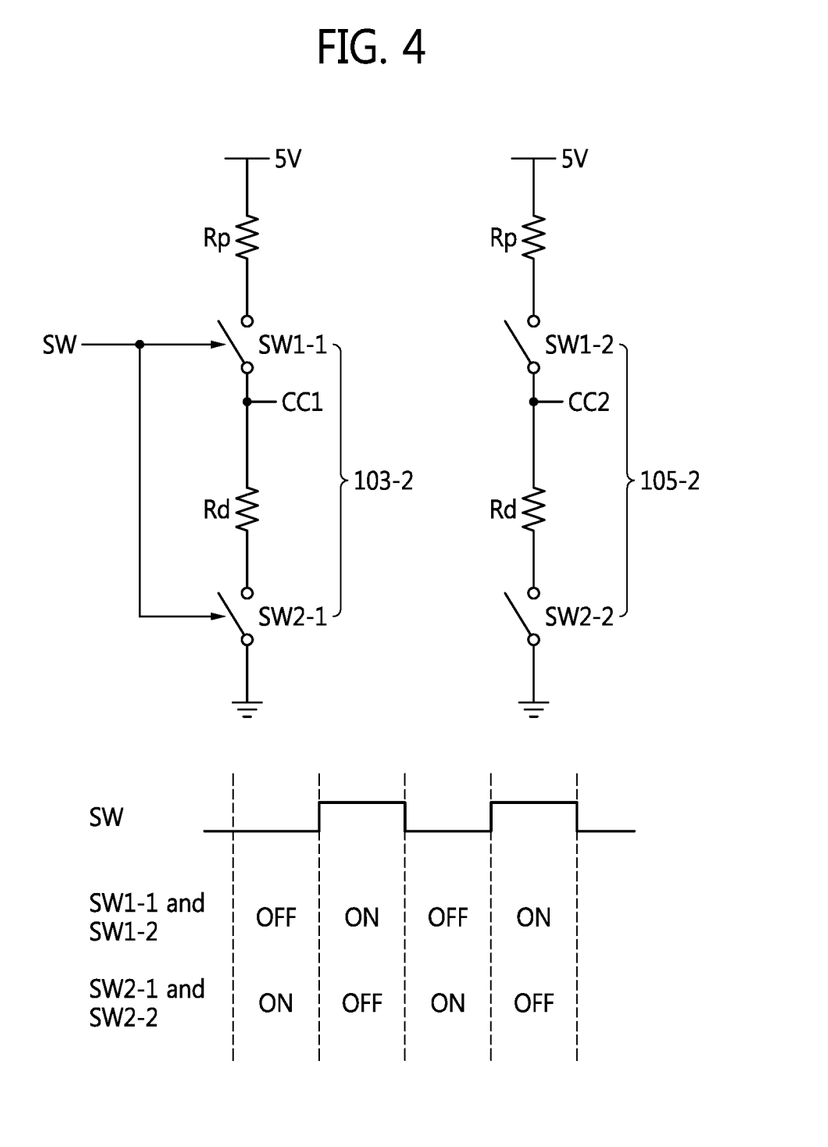
FIG. 4 is a waveform of a switch signal for the DRP.

FIG. 4 illustrates a waveform of a switch signal for the DRP. Referring to FIGS. 3 and 4, respective switches SW1-1, SW1-2, SW2-1, and SW2-2 are alternately turned ON and OFF in response to the third switch signal SW for the DRP in a normal mode. As the third switch signal SW oscillates or toggles between a high level and a low level, power is consumed in first USB power-delivery device 100.

Figure 5:
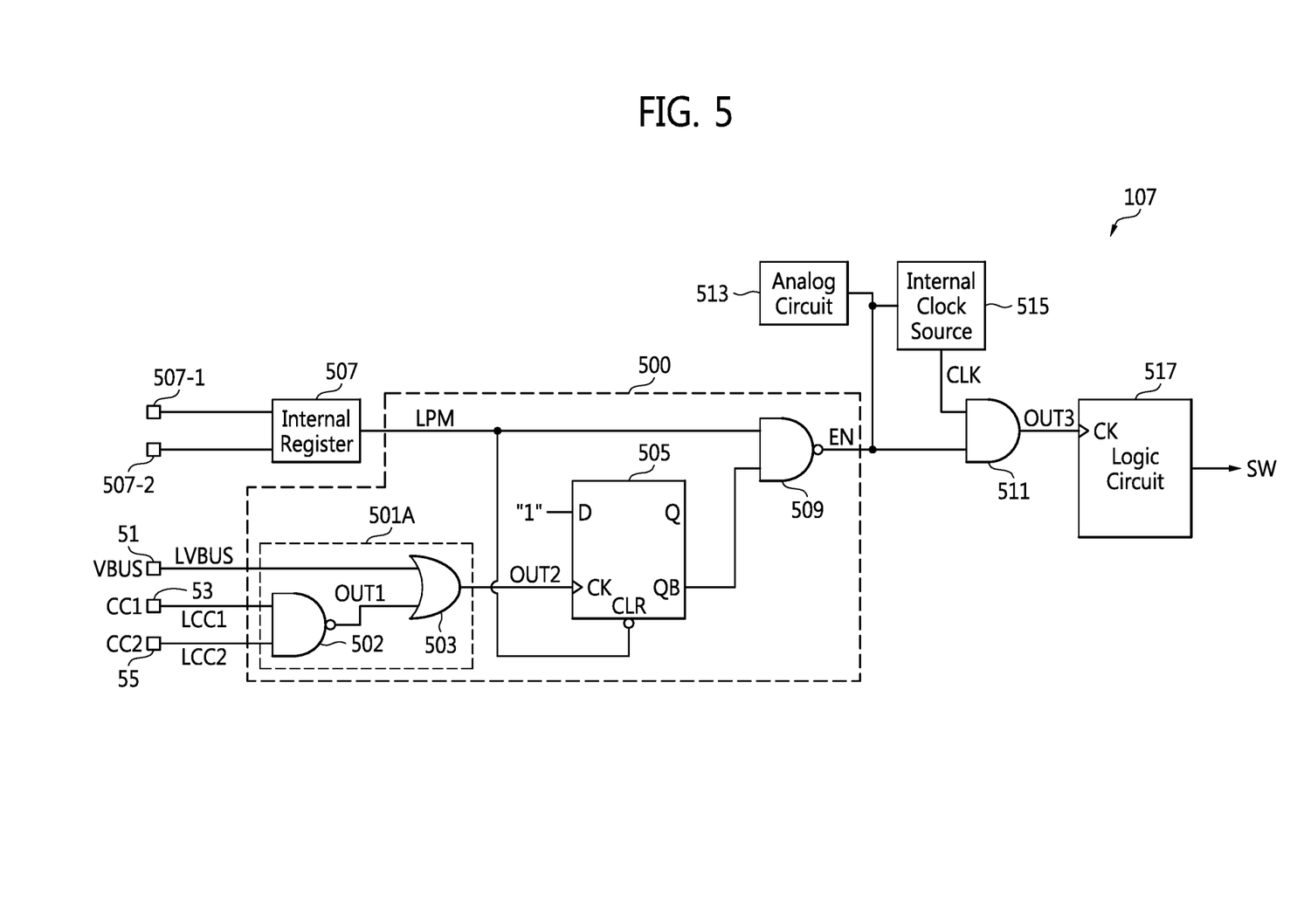
FIG. 5 is a block diagram of a control circuit shown in FIG. 3.
Figure 6:
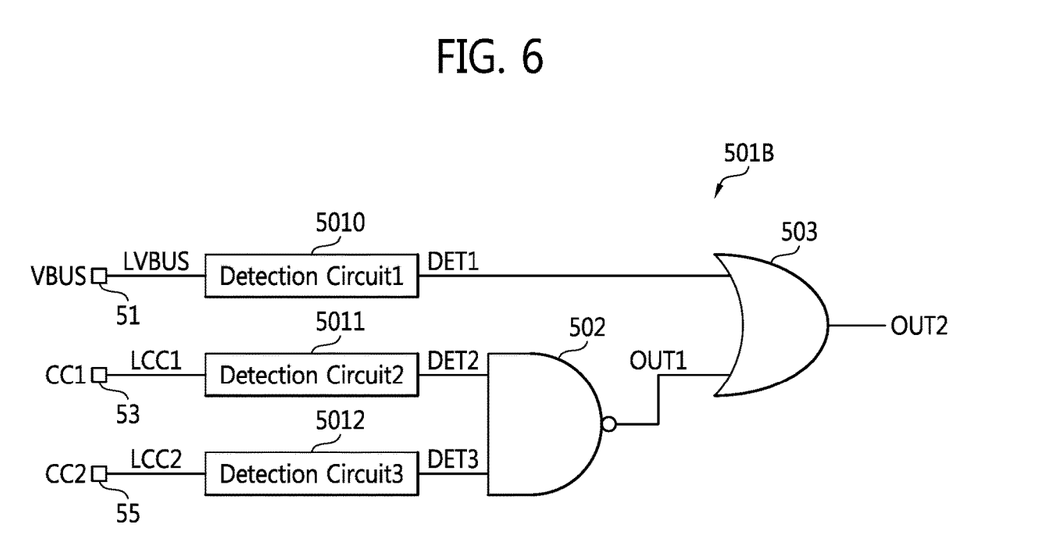
FIG. 6 is a diagram of an embodiment of an enable signal generator shown in FIG. 5.

FIG. 5 is a block diagram of a control circuit shown in FIG. 3, and FIG. 6 is a detailed block diagram of an enable signal generator shown in FIG. 5. Control circuit 107 may include an enable signal generator 500, an internal register 507, a masking circuit 511, an analog circuit 513, an internal clock source 515, and a logic circuit 517.

In a low power mode of USB power-delivery device 100, control circuit 107 stops generation of an internal clock signal CLK for a dual-role port (DRP) until an attach event occurs, and USB power-delivery device 100 starts the generation of the internal clock signal CLK for the DRP in the normal mode after USB power-delivery device 100 returns to a normal mode from the low power mode according to (or based on) occurrence of the attach event. The third switch signal SW for the DRP is generated based on the internal clock signal CLK.

Enable signal generator 500 may detect a change in voltage of at least one of VBUS pin 51, CC1 pin 53, and CC2 pin 55, and generate an enable signal EN indicating whether an attach event occurs according to a result of the detection.

Enable signal generator 500 includes a detection circuit 501A, a D-flip-flop 505, and a first NAND gate circuit 509. Detection circuit 501A detects a change in voltage of one of VBUS pin 51, CC1 pin 53, and CC2 pin 55, and outputs a detection signal OUT2. D-flip-flop 505 includes a clock terminal CK for receiving the detection signal OUT2, an input terminal D for receiving input data, and an inverted output terminal QB for outputting inverted latch data, and a reset terminal CLR for receiving an operation mode signal LPM.

A value of the operation mode signal LPM may be stored in an internal register 507. The value of the operation mode signal LPM stored in internal register 507 may be determined by an I²C interface. For example, a first pin 507-1 may be a pin connected to a serial clock line (SCL) and a second pin 507-2 may be a pin connected to a serial data line (SDA). Even though internal register 507 is shown in FIG. 5, internal register 507 may determine and store a value of the operation mode signal LPM using a serial clock input through the SCL and serial data input through the SDA. A value of the operation mode signal LPM may be determined to be a low level L by default. The CPU 103 shown in FIG. 1A may configure the value of the operation mode signal LPM stored in the internal register 507 by controlling the I²C interface to enable or disable the enable signal EN.

First NAND gate circuit 509 performs an NAND operation on the operation mode signal LPM and an output signal of the inverted output terminal QB and generates an enable signal EN.

As shown in FIG. 5, detection circuit 501A includes a second NAND gate circuit 502 which performs an NAND operation on the voltage LCC1 of CC1 pin 53 and the voltage LCC2 of CC2 pin 55, and an OR gate circuit 503 which performs an OR operation on the output signal OUT1 of second NAND gate circuit 502 and the voltage LVBUS of VBUS pin 51 and outputs the detection signal OUT2.

As shown in FIG. 6, according to some embodiments, detection circuit 501B may include a first detection circuit 5010, a second detection circuit 5011, a third detection circuit 5012, a second NAND gate circuit 502, and an OR gate circuit 503. In some embodiments, the detection circuit 501A may be replaced by the detection circuit 501B.

First detection circuit 5010 detects a change in the voltage LVBUS of VBUS pin 51 and outputs a first detection signal DET1. That is, first detection circuit 5010 detects a change of the voltage LVBUS of VBUS pin 51 from a low level to a high level and outputs the first detection signal DET1. For example, first detection circuit 5010 outputs the first detection signal DET1 having the high level when the voltage LVBUS of VBUS pin 51 is greater than a first reference voltage.

Second detection circuit 5011 detects a change in the voltage LCC1 of CC1 pin 53 and outputs a second detection signal DET2. That is, second detection circuit 5011 detects a change in the voltage LCC1 of CC1 pin 53 from a high level to a low level and outputs the second detection signal DET2. For example, second detection circuit 5011 outputs the second detection signal DET2 having the low level when the voltage LCC1 of CC1 pin 53 is less than a second reference voltage.

Third detection circuit 5012 detects a change in the voltage LCC2 of CC2 pin 55 and outputs a third detection signal DET3. That is, third detection circuit 5012 detects a change in the voltage LCC2 of CC2 pin 55 from a high level to a low level and outputs the third detection signal DET3. For example, third detection circuit 5012 outputs the third detection signal DET3 having the low level when the voltage LCC2 of CC2 pin 55 is less than the second reference voltage.

Second NAND gate circuit 502 performs a NAND operation on the second detection signal DET2 and the third detection signal DET3. OR gate circuit 503 performs an OR operation on the first detection signal DET1 and an output signal OUT1 of second NAND gate circuit 502 and outputs a detection signal OUT2.

Returning to FIG. 5, masking circuit 511 may transmit the internal clock signal CLK to logic circuit 517, or transmit a DC signal (or fixed clock signal) to logic circuit 517, according to a level (for example, a high level or a low level) of the enable signal EN.

Analog circuit 513 is disabled in a low power mode of a corresponding USB power-delivery device (e.g., USB power-delivery device 100) until an attach event occurs in a low power mode of first USB power-delivery device 100, and analog circuit 513 is enabled when first USB power-delivery device 100 returns to the normal mode from the low power mode according to the occurrence of the attach event. For example, the analog circuit 513 may collectively mean all analog circuits included in the control logic 107.

Internal clock source 515 used as a clock signal generator stops generation of the internal clock signal CLK in response to the enable signal EN having a low level, that is, an inactivated enable signal EN, and generates the internal clock signal CLK in response to the enable signal EN having a high level, that is, an activated state of enable signal EN. That is, when first USB power-delivery device 100 is in the low power mode, the enable signal EN is inactivated, and when an attach event occurs and first USB power-delivery device 100 returns to the normal mode, the enable signal EN is activated.

When the internal clock signal CLK is supplied to logic circuit 517 from masking circuit 511, logic circuit 517 may generate a third switch signal SW.

Figure 7:
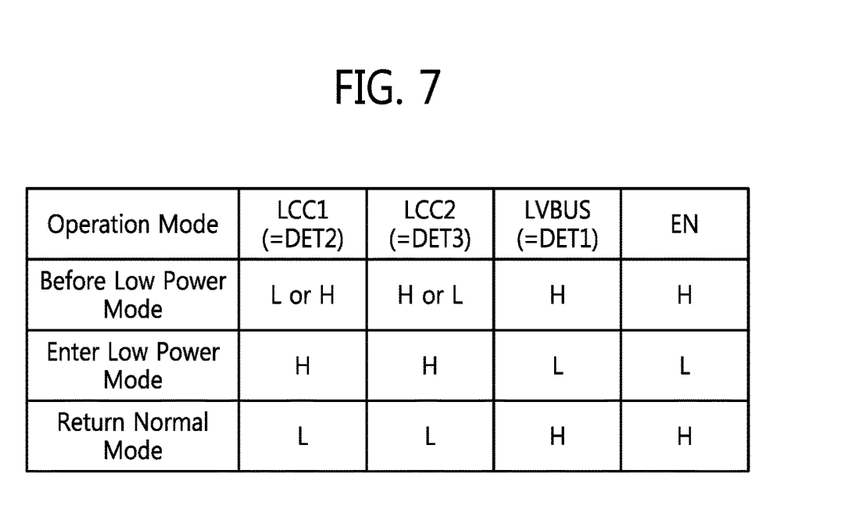
FIG. 7 shows operation modes of a first USB power-delivery device shown in FIG. 3.
Figure 8:
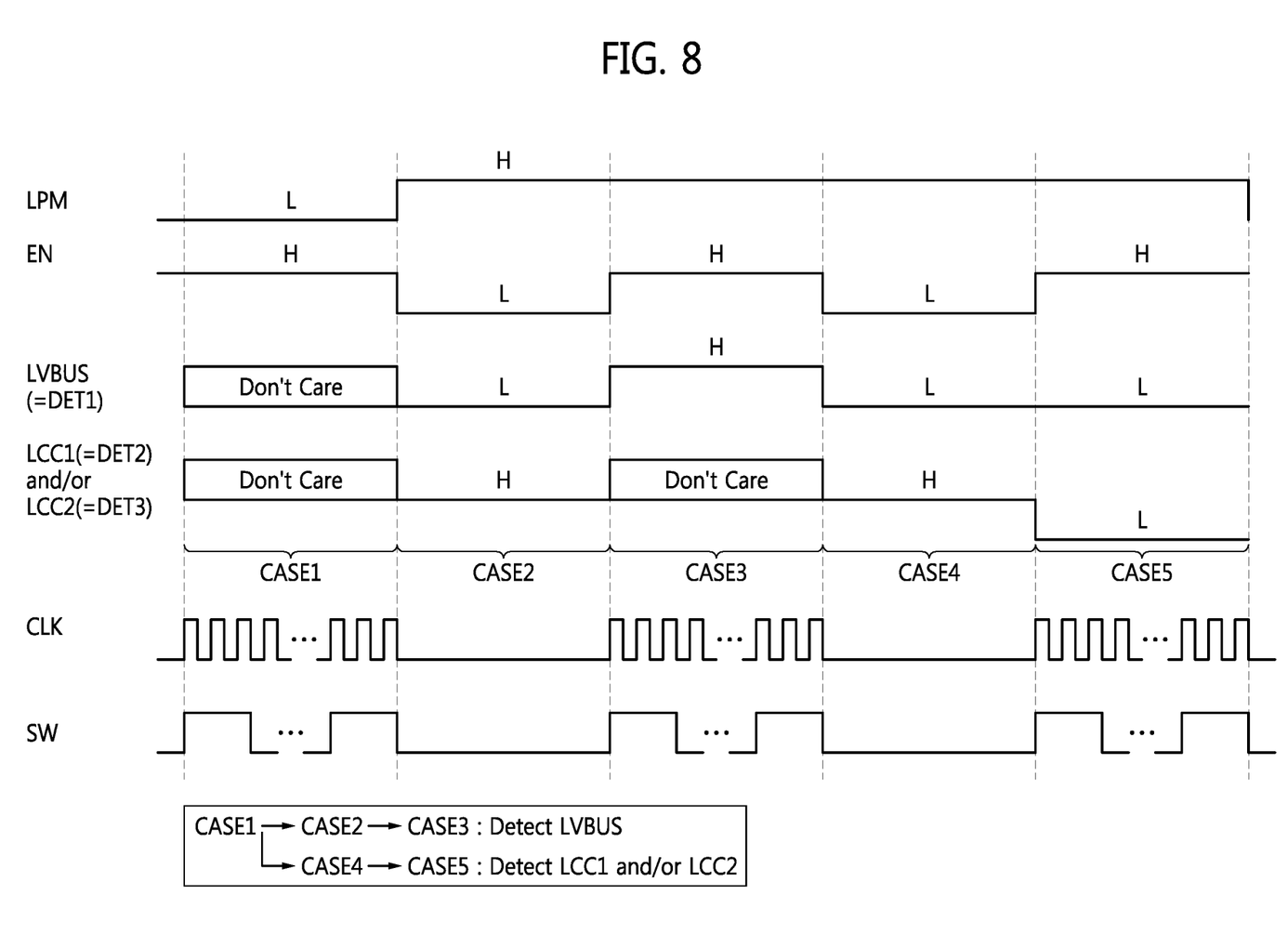
FIG. 8 shows an operation timing diagram of signals used in the first USB power-delivery device shown in FIG. 3.

FIG. 7 shows operation modes of a first USB power-delivery device shown in FIG. 3, and FIG. 8 shows an operation timing diagram of signals used in the first USB power-delivery device shown in FIG. 3. Referring to FIGS. 1 to 8, when the operation mode signal LPM is at a low level L while fourth USB power deliver device 400 is not connected to first USB power-delivery device 100 yet, a reset terminal CLR of D-flip-flop 505 outputs an output signal Q having a low level and an inverted output signal QB having a high level H in response to or according to the operation mode signal LPM having a low level L.

When the operation mode signal LPM is at a low level L, first NAND gate circuit 509 generates an enable signal EN having a high level H. Accordingly, analog circuit 513 is enabled in response to the enable signal EN having a high level H. Internal clock source 515 is enabled in response to the enable signal EN having a high level H, thereby generating the internal clock signal CLK.

Masking circuit 511, e.g., an AND gate, supplies the internal clock signal CLK to logic circuit 517 in response to the enable signal EN having a high level H. Accordingly, logic circuit 517 may generate a third switch signal SW using the internal clock signal CLK. That is, first USB power-delivery device 100 may generate a third switch signal SW for a DRP, and thus first USB power-delivery device 100 may perform the DRP using a third switch signal SW.

Case 1 (CASE1) shown in FIG. 8 corresponds to an operation mode before first USB power-delivery device 100 enters into the low power mode. That is, when the operation mode signal LPM is at a low level L, the enable signal EN is at a high level H regardless of the voltage LVBUS of VBUS pin 51, the voltage LCC1 of CC1 pin 53, and the voltage LCC2 of CC2 pin 55. Accordingly, internal clock source 515 generates a clock signal CLK and masking circuit 511 supplies the clock signal CLK to logic circuit 517, and thus, the third switch signal SW toggles or oscillates between a high level and a low level. As a result, first USB power-delivery device 100 may perform the DRP using the third switch signal SW.

As shown in FIG. 8, in CASE 2 (CASE2), internal register 507 outputs the operation mode signal LPM changing from a low level L to a high level H while fourth USB power-delivery device 400 is not connected or attached to first USB power-delivery device 100 yet.

Since the operation mode signal LPM is at a high level H, a reset of D-flip-flop 505 is released. However, while fourth USB power-delivery device 400 is not connected to first USB power-delivery device 100 yet, the voltage LVBUS of VBUS pin 51 is at a low level L and both the voltage LCC1 of CC1 pin 53 and the voltage LCC2 of CC2 pin 55 are at a high level H. Under these conditions, the first detection signal DET1 is at a low level L and both the second detection signal DET2 and the third detection signal DET3 are at a high level H. Accordingly, second NAND gate circuit 502 outputs an output signal OUT1 having a low level L and OR gate circuit 503 outputs a detection signal OUT2 having a low level L. Since the detection signal OUT2 having a low level L is input to the clock terminal CL of D-flip-flop 505, an output signal Q of D-flip-flop 505 maintains at a low level L and an inverted output signal QB of D-flop-flop 505 maintains at a high level H.

First NAND gate circuit 509 outputs an enable signal EN having a low level L in response to the operation mode signal LPM having a high level H and the inverted output signal QB of D-flip-flop 505 having a high level H, and thus analog circuit 513 is disabled and internal clock source 515 is disabled. Internal clock source 515 stops generation of the internal clock signal CLK. Since masking circuit 511 outputs a DC signal (that is, non-toggling clock signal) to logic circuit 517, logic circuit 517 does not generate a toggling third switch signal SW. As a result, first USB power-delivery device 100 enters into the low power mode and does not perform an operation for the DRP.

Accordingly, in CASE 2 analog circuit 513 and internal clock source 515 are disabled, masking circuit 511 outputs a DC signal, logic circuit 517 outputs a DC signal, and thus power consumed in first USB power-delivery device 100 may be reduced.

As shown in FIG. 8, in CASE 3 (CASE3), when fourth USB power-delivery device 400 is connected to first USB power-delivery device 100, that is, when an attach event occurs, internal register 507 is assumed to output an operation mode signal LPM maintaining at a high level H. At this time, it is assumed that the operation mode signal LPM changes in an order of Case 1 (CASE1)☐Case 2 (CASE2) ☐Case 3 (CASE3).

As fourth USB power-delivery device 400 is connected or attached to first USB power-delivery device 100, the voltage LVBUS of VBUS pin 51 or the first detection signal DET1 transits from a low level to a high level.

When the voltage LVBUS of VBUS pin 51 or the first detection signal DET1 is at a high level, OR gate circuit 503 outputs a detection signal OUT2 having a high level regardless of the voltage LCC1 of CC1 pin 53 and the voltage LCC2 of CC2 pin 55. Since the detection signal OUT2 having a high level H is supplied to the clock terminal CK of D-flip-flop 505, input data having a high level (H=1) are output as an output signal Q and an inverted output signal QB having a low level L is output. First NAND gate circuit 509 outputs an enable signal EN having a high level H in response to the operation mode signal LPM having a high level H and the inverted output signal QB having a low level L. That is, first USB power-delivery device 100 returns to the normal mode from the low power mode.

Analog circuit 513 is enabled in response to the enable signal EN having a high level H. Moreover, internal clock source 515 generates a clock signal CLK in response to the enable signal EN having a high level H. Masking circuit 511 supplies the internal clock signal CLK to logic circuit 517. Logic circuit 517 generates the third switch signal SW toggling in response to a toggling internal clock signal CLK. Accordingly, first USB power-delivery device 100 may perform an operation for the DRP in response to the third switch signal SW.

Continuously, it is assumed that the operation mode signal LPM changes in an order of Case 1 (CASE1)→Case 4 (CASE4)→Case 5 (CASE3). An operation of first USB power-delivery device 100 in Case 4 (CASE4) is the same as an operation of first USB power-delivery device 100 in Case 2 (CASE2). That is, since the inverted output signal QB of D-flip-flop 505 in Case 4 (CASE4) is at a high level H, the enable signal EN is at a low level. Accordingly, an operation mode of first USB power-delivery device 100 is the low power mode.

In Case 5 (CASE5), when fourth USB power-delivery device 400 is connected to first USB power-delivery device 100 operating in the low power mode, that is, when an attach event occurs, it is assumed that internal register 507 outputs the operation mode signal LPM maintained at a high level H.

As fourth USB power-delivery device 400 is connected to first USB power-delivery device 100, a voltage (LCC1 and/or LCC2) of at least one of CC1 pin 53 and CC2 pin 55 or at least one of the detection signals DET2 and DET3 transits from a high level to a low level.

When the voltage (LCC1 and/or LCC2) of at least one of CC1 pin 53 and CC2 pin 55 or at least one of the detection signals DET2 and DET3 is at a low level L, OR gate circuit 503 outputs the detection signal OUT2 having a high level H regardless of the voltage LVBUS of VBUS pin 51.

Since the detection signal OUT2 having a high level H is supplied to the clock terminal CK of D-flip-flop 505, input data having a high level (H=1) are output as an output signal Q and the inverted output signal QB having a low level L is output. First NAND gate circuit 509 outputs the enable signal EN having a high level H in response to the operation mode signal LPM having a high level H and the inverted output signal QB having a low level L. That is, first USB power-delivery device 100 automatically returns to the normal mode from the low power mode.

Analog circuit 513 is enabled in response to the enable signal EN having a high level H. Moreover, internal clock source 515 generates the internal clock signal CLK in response to the enable signal EN having a high level H. Masking circuit 511 supplies the internal clock signal CLK to logic circuit 517. Logic circuit 517 generates a third switch signal SW toggling in response to a toggling clock signal CLK. Accordingly, first USB power-delivery device 100 may perform an operation for the DRP in response to the third switch signal SW.

Figure 9:
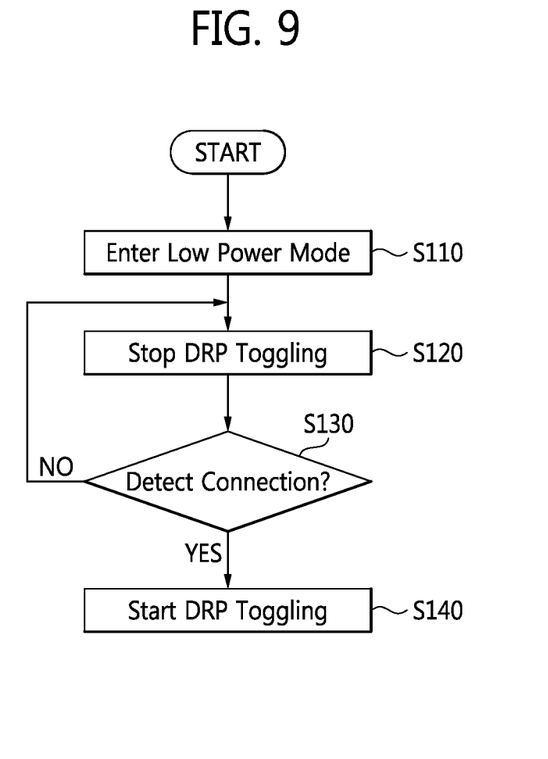
FIG. 9 is a flow chart which describes an operation of the first USB power-delivery device shown in FIG. 3.

FIG. 9 is a flow chart which describes an operation of the first USB power-delivery device shown in FIG. 3. Referring to FIGS. 1 to 9, first USB power-delivery device 100 enters into the low power mode from the normal mode, as in the transition from CASE 1 (CASE1) to CASE 2 (CASE2), or the transition from CASE 1 (CASE1) to CASE 4 (CASE4) (S110).

When an operation mode of first USB power-delivery device 100 is the low power mode, control circuit 107 stops toggling for a DRP, that is, generation of the toggling third switch signal SW (S120).

When fourth USB power-delivery device 400 is connected to first USB power-delivery device 100 operating in the low power mode (YES in S130), control circuit 107 generates toggling for the DRP, that is, the toggling third switch signal SW (S140). When fourth USB power-delivery device 400 is not connected to first USB power-delivery device 100 operating in the low power mode (NO in S130), control circuit 107 continuously performs a step 120.

As described above, a USB power-delivery device entering (or operating) into the low power mode stops generation of a clock signal CLK for a DRP until an attach event occurring according to a connection to another USB power-delivery device occurs. The USB power-delivery device automatically returns to the normal mode from the low power mode according to occurrence of the attach event, and the USB power-delivery device generates a clock signal CLK for the DRP in the normal mode.

A USB power-delivery device of the related art continuously generates a clock signal for a DRP before an attach event occurs. Accordingly, the USB power-delivery device of the related art consumes lots of power. However, a USB power-delivery device operating in the low power mode according to an embodiment of the present inventive concepts stops generation of the clock signal CLK for a DRP until the attach event occurs, thereby reducing power consumed in the USB power-delivery device.

A clock signal generator of the USB power-delivery device according to an exemplary embodiment of the present inventive concepts can stop generation of a clock signal for a dual-role port (DRP) until an attach event occurs in a low power mode and start the generation of the clock signal for the DRP after the attach event occurs.

In addition, the USB power-delivery device can disable an analog circuit until the attach event occurs in the low power mode, and enable the analog circuit after the attach event occurs.

As a result, the USB power-delivery device can disable the clock signal generator and the analog circuit until the attach event occurs in the low power mode, and reduce static current consumed in each of the clock signal generator and the analog circuit, thereby extending a life of a battery supplying a power to the USB power-delivery device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of operating an universal serial bus (USB) power-delivery device, the method comprising:
   operating the USB power-delivery device in a normal mode;
   switching an operating mode of the USB power-delivery device from the normal mode to a low power mode;
   in response to the switching to the low power mode, stopping generation of a clock signal for dual-role port (DRP) operation of the USB power-delivery device;
   detecting a connection of another USB device to the USB power-delivery device while the USB power-delivery device is in the low power mode;
   in response to detecting the connection, switching the operation mode of the USB power-delivery device from the low power mode to the normal mode; and
   generating the clock signal for the DRP operation of the USB power-delivery device based on the switching to the normal mode.

2. The method of claim 1, wherein the switching of the operating mode to the low power mode comprises activating a low power mode (LPM) signal from logic low to logic high.

3. The method of claim 1, wherein the connection with the other USB device is determined based on a voltage value for at least one of a VBUS pin, a configuration channel 1 (CC1) pin, and a configuration channel 2 (CC2) pin.

4. The method of claim 3, wherein the operation mode is switched from the low power mode to the normal mode if the USB power-delivery device is a source device and the other USB device is a sink device, and if a voltage value for the VBUS pin is greater than a predetermined first voltage value.

5. The method of claim 3, wherein the operation mode is switched from the low power mode to the normal mode if a voltage value for the VBUS pin is less than a predetermined first voltage value, and if a voltage value for one of the CC1 pin and the CC2 pin is less than a predetermined second voltage value.

6. The method of claim 2, wherein the LPM signal is determined based on a serial clock line (SCL) and a serial data line (SDA).

7. The method of claim 2, wherein the LPM signal is set to the logic low as a default value.

8. The method of claim 2, wherein the clock signal for the DRP operation of the USB power-delivery device comprises a toggling signal between a logic high and a logic low.

9. The method of claim 1, wherein the other USB device comprises at least one of a charger device, a storage device, and a second USB power-delivery device.

10. The method of claim 9, wherein the USB power-delivery device is a sink device from which a power supply is provided and the other USB device is a source device which provides a power supply to the sink device, when the other USB device corresponds to the charger device, and
   wherein the USB power-delivery device is the source device and the other USB device is the sink device, when the other USB device corresponds to the storage device.

11. A universal serial bus (USB) power-delivery device, comprising:

a clock signal generator for generation of a clock signal for dual-role port (DRP) operation of the USB power-delivery device;
a USB interface, including a VBUS pin, a configuration channel 1 (CC1) and a configuration channel 2 (CC2) pin;
an enable signal generator which is configured to selectively activate the clock signal generator; and
a control circuit comprising the clock signal generator, the USB interface, and the enable signal generator,
wherein the control circuit is configured to:
   operate the USB power-delivery device in a normal mode;
   switch an operating mode of the USB power-delivery device from the normal mode to a low power mode,
   in response to the switching to the low power mode, stop generation of a clock signal for the DRP operation of the USB power-delivery device,
   detect a connection of another USB device to the USB power-delivery device while the USB power-delivery device is in the low power mode,
   in response to detecting the connection, switch the operation mode of the USB power-delivery device from the low power mode to the normal mode, and
   generate the clock signal for the DRP operation of the USB power-delivery device based on the switching to the normal mode.

12. The USB power-delivery device of claim 11, wherein the switching of the operating mode to the low power mode comprises activating a low power mode (LPM) signal from logic low to logic high.

13. The USB power-delivery device of claim 11, wherein the connection with the other USB device is determined based on a voltage value for at least one of the VBUS pin, the CC1 pin, and the CC2 pin.

14. The USB power-delivery device of claim 13, wherein the operation mode is switched from the low power mode to the normal mode if the USB power-delivery device is a source device and the other USB device is a sink device, and if a voltage value for the VBUS pin is greater than a predetermined first voltage value.

15. The USB power-delivery device of claim 13, wherein the operation mode is switched from the low power mode to the normal mode if a voltage value for the VBUS pin is less than a predetermined first voltage value, and if a voltage value for one of the CC1 pin and the CC2 pin is less than a predetermined second voltage value.

16. The USB power-delivery device of claim 12, wherein the LPM signal is determined based on a serial clock line (SCL) and a serial data line (SDA).

17. The USB power-delivery device of claim 12, wherein the LPM signal is set to the logic low as a default value.

18. The USB power-delivery device of claim 12, wherein the clock signal for the DRP operation of the USB power-delivery device comprises a toggling signal between a logic high and a logic low.

19. The USB power-delivery device of claim 11, wherein the other USB device comprises at least one of a charger device, a storage device, and a second USB power-delivery device.

20. The USB power-delivery device of claim 19, wherein the USB power-delivery device is a sink device from which a power supply is provided and the other USB device is a source device which provides a power supply to the sink device, when the other USB device corresponds to the charger device, and wherein the USB power-delivery device is the source device and the other USB device is the sink device, when the other USB device corresponds to the storage device.

* * * * *